(12) United States Patent
Pellegrino et al.

(10) Patent No.: US 7,826,976 B2
(45) Date of Patent: Nov. 2, 2010

(54) METHOD AND SYSTEM FOR DETECTING CHEMICAL, BIOLOGICAL, OR RADIOLOGICAL AGENTS

(75) Inventors: Francesco Pellegrino, Cold Spring Harbor, NY (US); Edward J. Vinciguerra, North Bellmore, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1070 days.

(21) Appl. No.: 11/536,610

(22) Filed: Sep. 28, 2006

(65) Prior Publication Data

US 2010/0253527 A1    Oct. 7, 2010

(51) Int. Cl.
*G01N 33/50* (2006.01)
(52) U.S. Cl. ..................................... 702/19
(58) Field of Classification Search .......... 702/19, 702/21–24, 26, 28–30, 32, 79, 168, 183, 702/188, 189, 193; 454/255, 342; 73/24.01, 73/24.06, 31.01, 31.02
See application file for complete search history.

(56) References Cited

U.S. PATENT DOCUMENTS

| | | | | |
|---|---|---|---|---|
| 4,121,767 | A * | 10/1978 | Jensen | 239/71 |
| 6,293,861 | B1 * | 9/2001 | Berry | 454/255 |
| 6,834,533 | B2 * | 12/2004 | Megerle | 73/45.4 |
| 6,931,913 | B2 * | 8/2005 | Manoosingh | 73/31.01 |
| 7,347,824 | B2 * | 3/2008 | Wilkinson et al. | 600/529 |

\* cited by examiner

*Primary Examiner*—Mohamed Charioui
(74) *Attorney, Agent, or Firm*—DeMont & Breyer, LLC

(57) ABSTRACT

A method and an apparatus for detecting the release of a chemical, biological, or radiological agent are disclosed. In some embodiments, a microphone is used to continuously monitor sound and acquire acoustic data and a sensor is used to substantially continuously monitor a property that is related to a chemical, biological, or radiological agent. The acoustic data is analyzed for a signature that is distinguishable from background sound. The sensor data is analyzed for an event that is indicative of the release of a chemical, biological, or radiological agent. The acoustic signature, and the time at which it is observed, is used to corroborate the sensor data.

20 Claims, 4 Drawing Sheets

METHOD AND SYSTEM FOR DETECTING CHEMICAL, BIOLOGICAL, OR RADIOLOGICAL AGENTS

The present invention relates to the detection of chemical, biological, and radiological agents.

BACKGROUND OF THE INVENTION

A chemical, biological, or radiological attack on a civilian population is a dreadful event. The best response requires the earliest possible detection of the attack so that individuals can flee and civil defense authorities can contain its effects. To this end, chemical, biological, and radiological ("CBR") detection systems are being developed for deployment in urban centers.

But accurately detecting the presence of CBR agents that have been released in a public environment is a challenging task. A variety of factors can hamper detection and lead to false alarms. These factors include: background fluctuations in a property being monitored (e.g., particulate size, etc.), the presences of interferants, differing temperature and humidity conditions, low signal-to-noise ratio of a detector, and detector malfunctions, among others.

The public will have little tolerance for false alarms, especially those that result in significant inconvenience, such as the disruption of mass transit facilities during rush hour. If the false alarms were to occur with regularity, a "boy-who-called-wolf" attitude could rapidly develop; that is, the public would soon learn to ignore the alarms.

One way to reduce the incidence of false alarms would be to decrease detector sensitivity. But this is not a workable solution because however inconvenient a false alarm might be, a false-negative indication (i.e., an undetected attack), as might result from intentionally decreasing detector sensitivity, is far worse. Cognizant of this fact, scientists and engineers have addressed this problem in other ways.

One approach to improving the accuracy of CBR detection is to provide systems that incorporate plural detectors that use different analysis methods. The theory is that if multiple sensors that are based on different operating principles all indicate an alarm condition, there is a greater likelihood that the indication is correct than would be the case if the alarm were based on a single analysis method (even if performed by multiple sensors). The reality, however, is that the different analysis methods that are typically used are not truly independent, but rather quasi-independent. And these quasi-independent techniques might be susceptible to the same type of errors for a given set of conditions, thereby undercutting the validity of this approach. Furthermore, these sensors are typically expensive. And incorporating what is, essentially, redundant sensors, increases cost.

Another approach to decreasing false alarms is to use video cameras (e.g., to monitor suspicious activity, etc.) to supplement CBR sensors. Of course, to be of any value, the video feed requires constant human monitoring. The use of video monitoring is not, therefore, suitable for use with an autonomous system, as is most desired.

SUMMARY OF THE INVENTION

The present invention provides a method and system for CBR detection that avoids some of the costs and disadvantages of the prior art. In the illustrative embodiment of the present invention, two truly independent techniques are used to evaluate whether or not the release of a chemical, biological, or radiological agent has occurred.

In some embodiments, a CBR sensor and an acoustic sensor are situated in a environment that is to be monitored for the presence of a CBR agent. The CBR sensor, which can be based on any one or more of a variety of different sensing/detection technologies, provides a first indication of the presence of a CBR agent (e.g., a positive indication of its presence, an elevated concentration level in the monitored environment, etc.). In the illustrative embodiment, when the CBR sensor provides a positive indication of a CBR agent, acoustics-related data from the acoustic sensor is then analyzed.

The purpose of the acoustics-based analysis is to increase or decrease the confidence level of the initial positive indication from the CBR sensor. The confidence level of the initial indication is increased if an acoustics signature is identified that (1) is indicative of the release of a CBR agent and (2) is observed at a time that correlates to the time at which the CBR agent is identified from the CBR sensor. Conversely, the confidence level of the initial indication is decreased if there is an absence of such an acoustic signature at the relevant time.

The illustrative embodiment of the present invention comprises generating an alarm when:
(i) information derived from a first time-varying signal indicates that, at a time $t_2$, a chemical, biological, or radiological agent is present in a monitored environment; and
(ii) acoustics-based information derived from a second time-varying signal is indicative of a release of the agent in said monitored environment at a time $t_1$, wherein the times $t_1$ and $t_2$ correlate to one another in terms of the release.

DETAILED DESCRIPTION

Figure 1:
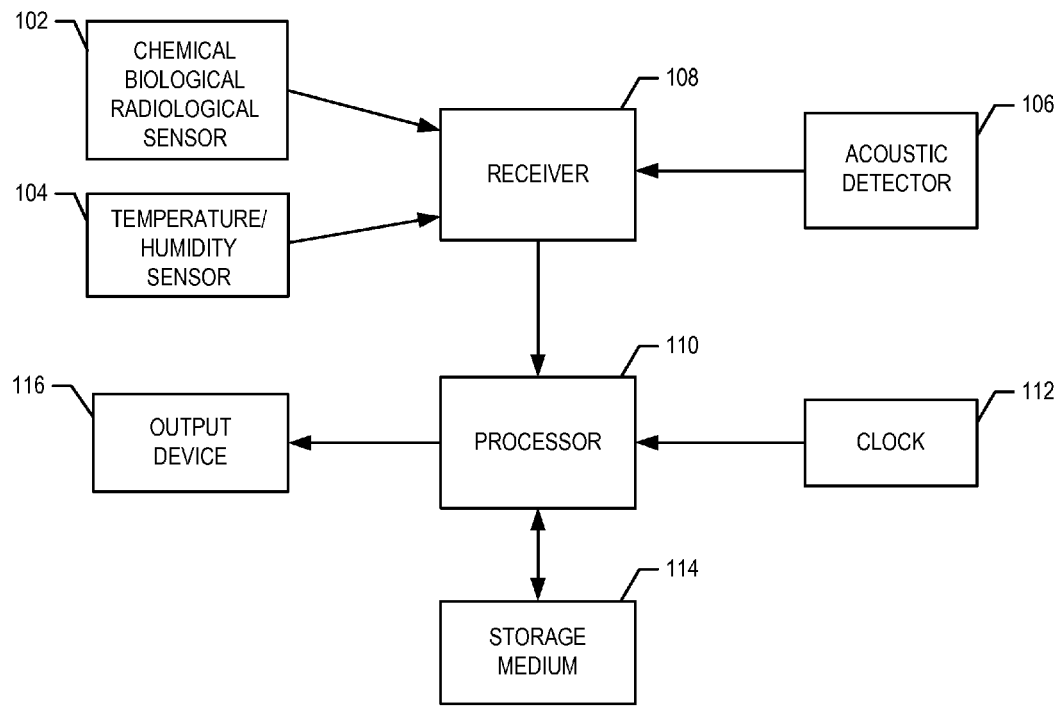
FIG. 1 depicts a system for detecting the release of a chemical, biological, or radiological agent in accordance with the illustrative embodiment of the invention.

FIG. 1 depicts system 100 for detecting the release of a chemical, biological, or radiological agent in accordance with the illustrative embodiment of the invention.

In some embodiments, system 100 comprises several different types of sensors/detectors (102, 104, and 106), transceiver 108, processing-related elements (110, 112, and 114), and output device 116.

CBR sensor/detector 102 monitors the local environment and obtains data related to a property of a chemical, and/or biological, and/or radiological agent. The property that is being monitored is a function of the particular technology and technique that is ultimately used to detect and/or identify the agent.

The phrase "related to a property of a chemical, biological or radiological agent," as used in this Detailed Description and the appended claims, means a property that is useful for determining if a CBR agent is present, its concentration, etc. The property need not be unique to CBR agents. Rather, it must simply be a property that can be used to provide an indication, inferential or otherwise, that a CBR agent might be present in the environment. An example of a property that is not unique to CBR agents but does provide useful information as to their presence is "particle concentration." For example, if the concentration of particles having a certain size range exceeds a certain concentration, this could be indicative of a release (i.e., attack).

In some embodiments, CBR sensor/detector 102 provides a sensing function, but not a detection function. That is, it simply senses a property and creates an output signal responsive to the sensed property. In some embodiments, the sensor might perform some limited processing of the acquired property data. The data is then transmitted to a separate processor to determine, based on the data, if the monitored agent is present, its concentration, etc. In some other embodiments, CBR sensor/detector 102 provides both a sensing and a detecting function. That is, in addition to performing a sensing function, it performs the processing necessary for determining if the monitored agent is present, etc.

For use in conjunction with the illustrative embodiment of the present invention, CBR sensor/detector 102 can be either a sensor or a detector. As will become clearer later in this specification, the significance of the CBR sensor/detector 102 in the context of the present invention is to provide an initial indication of elevated levels, etc. of a CBR agent, which could be indicative of a CBR attack. The focus of the invention is to increase the confidence level of a suspected CBR release event by corroborating the indication provided by CBR sensor/detector 102 with a second, truly independent indication. This second, independent confirmation, which is provided by acoustic sensor 106, should reduce the incidence of false alarms. For convenience, CBR sensor/detector 102 will be referred hereinafter in the description and in the appended claims as "CBR sensor 102," it being understood that this designation is meant to encompass both CBR sensors and CBR detectors, unless otherwise indicated.

CBR sensor 102 is deployed in a region to be monitored for the presence of CBR agents. In some embodiments, as a function of the size and layout of the monitored region, multiple CBR sensors 102 are used. CBR sensors 102 obtain continuous readings of whatever property of the chemical, biological, or radiological agent(s) it is monitoring. In some embodiments, CBR sensor 102 generates a time-varying signal $p(t)$, in known fashion, which contains information related to the monitored property. In some of the embodiments in which sensor 102 is actually a detector, the signal generated by the detector is not a time-varying signal pertaining to the monitored property; rather, it is simply an indication of the elevated levels, etc., of the monitored agent, as determined by the detector.

As described further below, different technologies and techniques are used for sensing/detecting chemical, biological, and radiological agents. As a consequence, it is understood that in embodiments in which more than one type of agent (e.g., chemical and biological, or biological and radiological, etc.) are being monitored, CBR sensor 102 comprises two or more sensors/detectors as are appropriate for the agents being monitored. If each CBR sensor 102 is actually two or more sensors for monitoring two or more different types of agents, then two or more time-varying signals $p_1(t)$ and $p_2(t)$, etc., each of which contains information relating to property that the associate sensor is monitoring, is generated.

The three types of agents—chemical, biological, and radiological—are discussed separately below, including representative technologies and techniques for sensing and detection. These techniques and technologies have been implemented in various commercially-available sensing/detection devices. Such devices are used, in various embodiments, to implement CBR sensor 102.

Chemical agents are chemicals that are intended to disorientate, harass, impair and/or kill personnel. Chemical antipersonnel agents usually fall into one of two categories: casualty or incapacitating. Examples of the former include nerve agents (e.g., VX, Sarin, etc.), blister agents (e.g., mustard gas, etc.), and arsenical vesicants. An example of the latter is nuisance agents, such as agents that cause coughing, choking, and the like.

Technologies suitable for sensing/detecting chemical agents include enzymatic techniques, colorimetric techniques, ion mobility spectroscopy, infrared detection techniques (e.g., photoacoustic infrared spectroscopy, filter-based infrared spectroscopy, differential absorption light detection and ranging, and passive infrared detection such as forward-looking infrared spectroscopy and Fourier transform spectroscopy), photo ionization detection, flame photometry, surface acoustic wave detection, and carbon nanotube gas ionization sensors.

Biological agents are living organisms, toxins and micro toxins that are used to disable or destroy people and/or domestic animals, damage crops and/or deteriorate supplies. More particularly, biological agents include bacterial agents (e.g., anthrax, brucellosis, *E. coli* serotype, tularemia, cholera, etc.), viral agents (e.g., Marburg virus, Junin virus, Rift Valley Fever virus, small pox, Dengue Fever virus, Ebola virus, etc.), rickettsiae (e.g., endemic typhus, epidemic typhus, Q Fever, Rocky Mountain Spotted Fever, etc.), and biological toxins (e.g., botulinum toxin, staphylococcal enterotoxin B, Ricin, etc.).

Technologies for sensing, detecting and in some cases identifying biological agents are relatively new. Techniques include particle measurement, fluorescence techniques, flow cytometry, and mass spectrometry.

Typical radiological agents include alpha particles, beta particles, and gamma rays. Scintillation detectors are used for the detection of alpha particles and gamma rays, and Geiger-Muller detectors are used for the detection of beta particles and gamma rays. Scintillation detector technology provides for the cost effective screening of common radiopharmaceuticals and the identification of the most probable illicit radiological agents.

In some embodiments, the inventions disclosed in co-pending U.S. patent application Ser. Nos. 11/212,342 and 11/212,343, both of which were filed on Aug. 26, 2005 and are incorporated by reference herein in their entirety, are used in conjunction with the system disclosed herein to further improve system accuracy.

These applications disclose methods for increasing the accuracy of sensors/detectors that monitor the concentration of airborne particles. More particularly, those applications disclose methods that improve the ability to accurately discriminate between a "true" CBR release and a nominal increase in background particulate content. The methods involve generating a time-varying "threshold" that defines an "attack"/"no-attack" boundary. A particle count, etc., that exceeds the threshold is indicative of an attack. The threshold varies with time based on changes in the background particulate content, rather than using a fixed threshold.

The methods that are disclosed in U.S. patent application Ser. Nos. 11/212,342 and 11/212,343 are implemented for use herein via CBR sensor 102 and processor 110 running appropriate software.

Depending upon its particular implementation, CBR sensor 102 might be sensitive to temperature and humidity fluctuations. Therefore, in some embodiments, readings/results from CBR sensor 102 are adjusted as required based on temperature and humidity variations, as determined from temperature/humidity sensor 104.

Sensor 106 is an acoustic sensor, such as a microphone. This sensor obtains continuous acoustic readings of the area it's monitoring. Acoustic sensor 106 generates a time-varying signal a(t), in known fashion, which contains acoustics-related information. Examples of acoustics-related information include, without limitation, frequency distribution, signal amplitude, temporal energy distribution, spectral energy distribution, or phase information. Typically, plural acoustic sensors 106 are used.

In some embodiments, system 100 is deployed such that all system elements (i.e., sensing elements, processing elements, etc.) are co-located in the region that is being monitored. In some other embodiments, the area being monitored is remote from the location at which other elements of the system (e.g., processor 110, output device 116, etc.) are disposed. For example, in some embodiments, the sensors are disposed at one or more subway stops while the processor, etc., is disposed at a central control station.

In embodiments in which all elements of system 100 are co-located, the various sensors 102, 104, and 106 can output signals to processor 110. More typically, the processing and output elements are remote from the sensors in the monitored space such that it is expedient to transmit the output signals from the various sensors to transceiver 108.

Transceiver 108 receives signal(s) p(t) from CBR sensor 102, signal(s) from temperature/humidity sensor 104, and signal(s) a(t) from acoustic sensor 106. These signals (or information contained therein or otherwise related to the signals) are then transmitted to processor 110, in well-known fashion. In some embodiments in which CBR sensor 102 is actually a detector, the signal received by transceiver 108 might not be time-varying signal p(t), but rather simply an indication of elevated levels of a CBR agent.

As will be appreciated by those skilled in the art, in some embodiments, transceiver 108 receives signals from the various sensors via a wired link and then transmits them wirelessly to a control station where the processor, etc., is located. In some other embodiments, the sensors have an embedded wireless transmitter that transmits signals wirelessly to transceiver 108, and so forth. In some embodiments in which sensors are deployed at a variety of locations, a transceiver 108 is deployed at each location. It will be clear to those skilled in the art how to make and use transceiver 108.

In some embodiments, processor 110 is a general-purpose processor that is capable of: receiving information from transceiver 108; reading data from and writing data to storage medium 114; executing the operations described below and with respect to FIGS. 2 and 3; and outputting signals to output device 116. In some alternative embodiments of the present invention, processor 110 is implemented as multiple processors, including a general purpose processor for performing certain operations and a special-purpose processor, such as an acoustic signal processor for processing acoustics-related data, etc. In either case, it will be clear to those skilled in the art, after reading this specification, how to make and use processor(s) 110.

Clock 112 transmits the current time, date, and day of the week to processor 110 in well-known fashion.

Storage medium 114 stores data and executable instructions, as is well-known in the art, and might be any combination of random-access memory (RAM), flash memory, disk drive memory, etc. It will be clear to those skilled in the art, after reading this specification, how to make and use storage medium 114.

Output device 116 is a transducer (e.g., speaker, video display, etc.) that receives electronic signals from processor 110 and generates a corresponding output signal (e.g., audio alarm, video warning message, etc.), in well-known fashion. In other words, output device 116 provides an alarm or warning that release of a CBR agent has occurred. As will be appreciated by those skilled in the art, in some embodiments, output device 116 will receive signals from processor 110 via a wired link, while in some other embodiments system 100 includes a transmitter that transmits information from processor 110 to output device 116 (e.g., via radio-frequency signals, etc.). It will be clear to those skilled in the art how to make and use output device 116.

Figure 2:
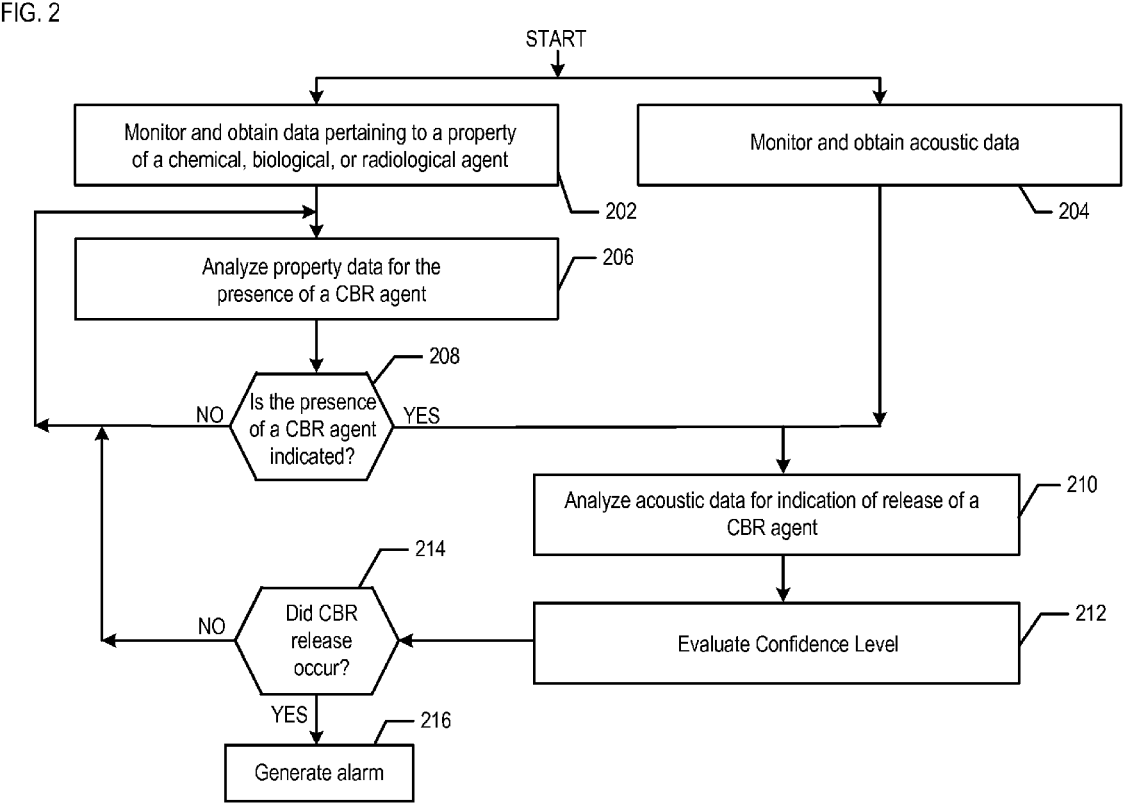
FIG. 2 depicts a method for detecting the release of a chemical, biological, or radiological agent in accordance with the illustrative embodiment of the invention.
Figure 3:
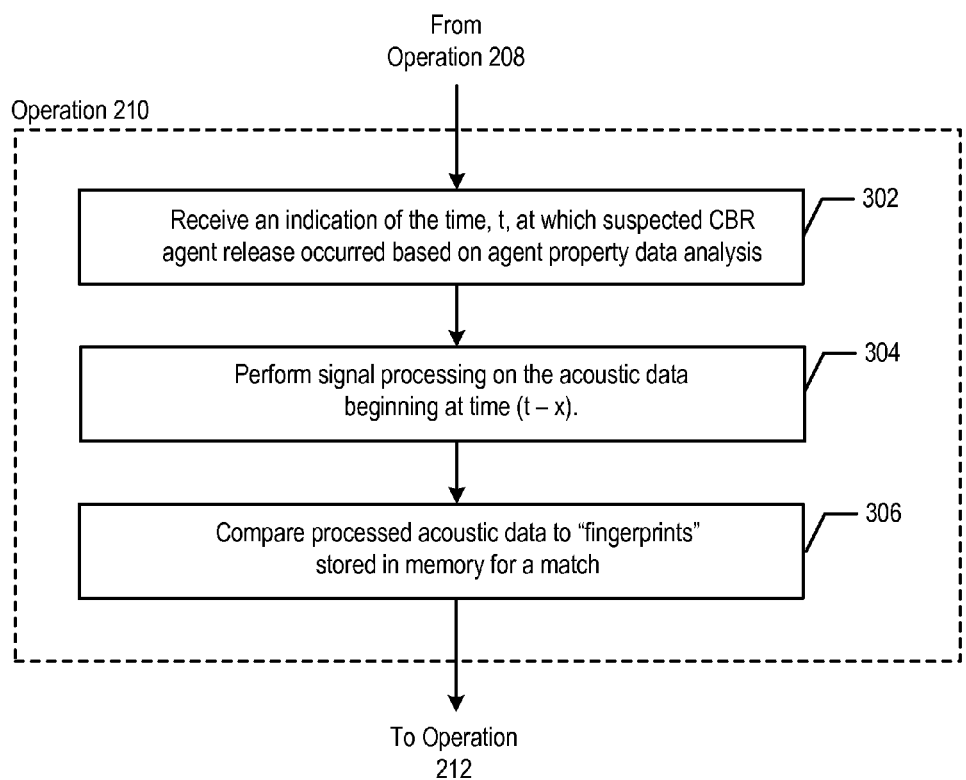
FIG. 3 depicts sub-operations that are conducted to analyze a signal for the purpose of determining if an acoustic signature contained in the signal is indicative of a sound that is likely to accompany the release of a chemical, biological, or radiological agent.

FIG. 2 depicts a flowchart of the salient operations performed by system 100, in accordance with the illustrative embodiment of the present invention. It will be clear to those skilled in the art which of the operations depicted in FIG. 2 can be performed simultaneously or in a different order than that depicted.

In accordance with operation 202, information related to a property of a chemical, biological, or radiological agent is acquired. Typically, this information is obtained from CBR sensor 102. The monitored property can be particle concentration, biofluoresence, size, mass, ion mobility or any other property that is monitored by known chemical, biological, and radiological sensors/detectors, including but not limited to the sensors/detectors disclosed above in conjunction with FIG. 1.

In accordance with operation 204, acoustics-related information is acquired. This information is acquired, for example, by monitoring the sounds in an environment using acoustic sensor 106 (e.g., microphones, etc.).

The information related to the property of the chemical, biological, or radiological agent that was obtained in operation 202 is analyzed in real time in operation 206. Depending upon the implementation of CBR sensor 102, operation 206 is performed via CBR sensor 102 (acting as a detector) or, alternatively, operation 206 is performed via a separate processor, such as processor 110.

At operation 208, query whether release of a CBR agent is suspected based on the analysis performed in operation 206. If there is no indication of a release, data acquisition and analysis simply continues in real-time.

On the other hand, if the data obtained in operation 202 indicates elevated levels of a CBR agent, then the acoustics-related data that is being obtained at operation 204 is analyzed at operation 210 for indication of a release event. In some embodiments, operation 210 comprises sub-operations 302 through 308 which are depicted in FIG. 3 and are described below.

A purpose of analyzing the acoustics-related data is to determine if there is an acoustic signature present within the data that is indicative of a sound that is likely to be associated with the release of a CBR agent.

In the illustrative embodiment, rather than continuously analyzing the acoustics-related data that is obtained in operation 204, analysis is performed for data that was acquired during a specific window of time. That window of time relates to the time at which the elevated levels of the CBR agent occurs in the data that is obtained at operation 202. In other words, if elevated levels of a CBR agent first appear in the data (obtained in operation 202) at 4:25 pm, then the only acoustics data that will be analyzed is data that was obtained at approximately 4:25 pm.

Thus, sub-operation 302 of operation 210 comprises receiving an indication of the time, t, at which the suspected release occurred based on the analyses of data from CBR sensor 102.

Examples of sounds that might accompany the release of a CBR agent include:
- the breaking of a bottle, which could be indicative of the release of a biological agent;
- a characteristic, high-frequency sound of gas escaping from a pressurized container, which could be indicative of the release of a chemical agent;
- an explosion, which could be indicative of detonation of a radiological dispersive device; and
- sounds attributable to general commotion, such as screams or the like, which could be indicative of the effects of chemical agents or general terrorist activity.

Clearly, these sounds could be indicative of other, less diabolical events. But the presence of these sounds coupled with elevated levels of a CBR agent, as determined from CBR sensors, increases the confidence level of the analysis and the likelihood that the indications are correct.

In accordance with some embodiments, acoustics signatures or fingerprints are obtained for the characteristic sounds listed above (and any other sounds that are potentially useful in this regard). In various embodiments, the acoustic signatures include one or more of the following types of information: frequency distribution, signal amplitude, temporal energy distribution, spectral energy distribution, phase information. These fingerprints are obtained using any of a variety of known acoustic processing techniques, such as fast Fourier transforms and the like. These acoustics fingerprints are then stored in a processor-readable storage medium (e.g., storage medium 114) to serve as reference acoustic signatures.

In this Detailed Description and the appended claims, the phrases "acoustic signature indicative of release." or "acoustic signature associated with the release." of CBR agents means an acoustic signature that is representative of a sound that accompanies release of the agent (e.g., escaping gas, breaking of glass, etc.) or that can be heard shortly thereafter (e.g., yells, screams, etc.) based on the effects of the release.

So, in some embodiments of operation 210, sub-operation 304 is performed wherein an acoustic signature is obtained from the acoustics-related data that is obtained in operation 204. The signature is in a form that is appropriate for comparison with the reference acoustic signatures that are stored in memory.

As previously indicated, the acoustic signature of relevance is for data that was obtained at a time that correlates to the time at which the elevated levels of the CBR agent was observed. More particularly, analyses of the acoustics-related data begins at time (t−x), where x is an expected time delay between the release event and the appearance of elevated levels, etc., of the released agent, as indicated via CBR sensors 102. Further explanation of time delay x is provided below.

Continuing with the previous example, a sound that pertains directly to the release of an agent (e.g., escaping gas, breaking of bottle, etc.), would be expected to be observed, if present, sometime before the elevated levels of the agent are identified at 4:25 pm. As a consequence, the analysis of the acoustics-related data might be limited to a ten-minute window of time beginning with data acquired at 4:15 pm and ending with acoustics data that was acquired at 4:25 pm.

A sound that pertains to the effect of released agent (e.g., yelling, etc.) would be expected to be observed, if present, sometime after the elevated levels of the agent are first observed in the data. Thus, analysis of the acoustics-related data for this type of acoustics signature might be limited to a two-minute window of time beginning at 4:25 pm and ending at 4:27 pm. Performing the data analysis for a specific window of time reduces processing requirements, thereby increasing the response speed of the system.

Thus, time delay x is a negative number if the sound pertains to the effect of the released agent, since the effect is likely to be observed after elevated levels are detected.

The time delay, x, between the occurrence of a sound that accompanies the release of a CBR agent and the appearance of elevated levels of the agent is dependent on a variety of factors including, without limitation, the distance between CBR sensor 102 and the location at which the agent is actually released; prevailing air currents within the monitored region, the position of CBR sensor 102 relative to the air currents, and the specific agent that is released. (Acoustic sensor 106 is assumed to be in the vicinity of CBR sensor 102.) Simple experimentation with simulants (e.g., non-harmful agents that are similar in size, etc., to CBR agents) in the monitored region will provide a reasonably accurate estimate of the expected time delay.

As used in this Detailed Description and the appended claims, when two different times, $T_1$ and $T_2$, are said to be "correlated," it means that both of these times pertain to the same CBR release event. They are correlated to one another, as opposed to being the same time, since the time at which elevated levels of a CBR agent is first detected will be some time after the CBR agent is actually released.

In some embodiments of operation 210, sub-operation 308 is performed wherein the acoustic signature that is obtained at sub-operation 306 is compared to the reference acoustic fingerprints. The comparison is performed via any one of a number of suitable processing techniques, such as, without limitation, fuzzy logic, wavelets, or neural-net processing.

In some embodiments of operation 210, rather than attempting to match an acoustic signature from the data to a reference acoustic signature, the acoustic data is simply analyzed for a change in signature during the appropriate time window. The fact that a change in the character of ambient sound is identified, in the appropriate window of time, provides some increase in the confidence level that elevated readings obtained from CBR sensor 102 are, indeed, indicative of a CBR release event.

At operation 212, the confidence level as to the occurrence of a CBR release event is evaluated. The evaluation considers the nature of analysis performed with respect to operations 202, 206, and 208, such as the analysis method used, the number of sensors reporting, and the estimated levels of the CBR agent. The evaluation of the confidence level also considers whether or not the acoustics-related data corroborates the results obtained from CBR sensor 102, and whether or not the corroboration is based on identifying an acoustic signature as being indicative of a CBR release event or simply the occurrence of sounds at the appropriate time and having certain characteristics.

In some embodiments, a look-up table of confidence levels is developed for various scenarios, as described above, and stored in memory. At operation 212, the confidence level is determined from the look-up table.

Query at operation 214 whether an alarm is warranted. The look-up table provides as indication of whether or not to issue an alarm as a function of the confidence level. An alarm is generated at operation 216 if so indicated as a function of the confidence level. If not, monitoring continues.

Figure 4:
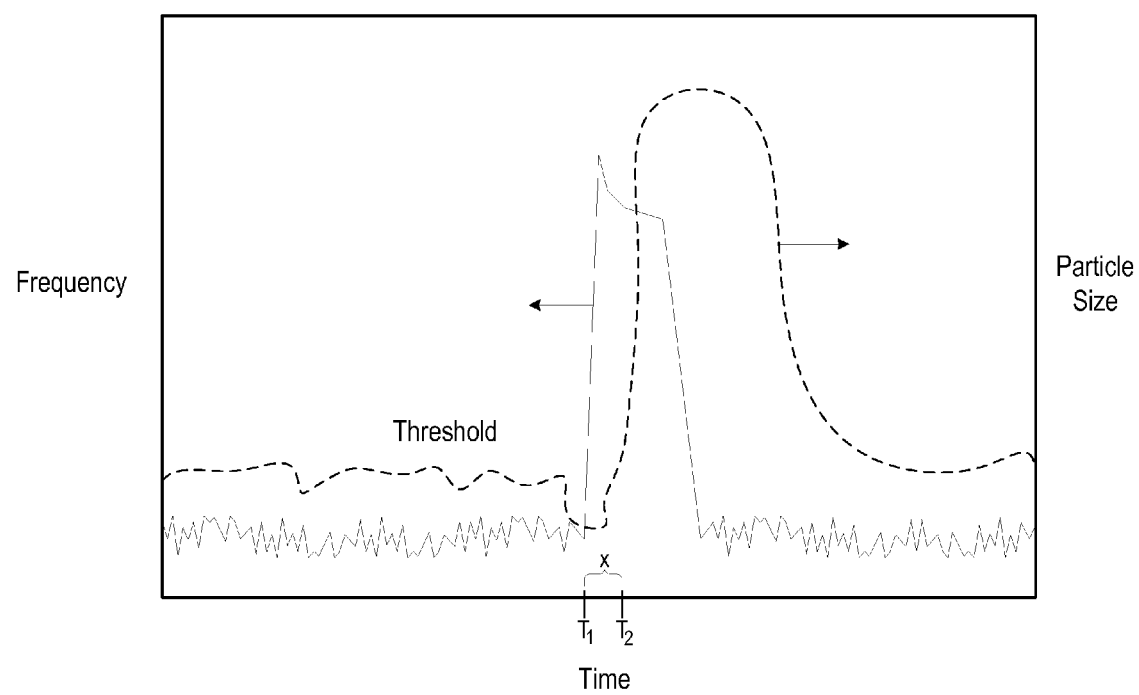
FIG. 4 depicts plots of sensor property data and detector acoustic data that illustrate acoustic corroboration of a release of a chemical, biological, or radiological agent in accordance with the present invention.

FIG. 4 depicts plots of (1) a property of a CBR agent (in particular, particle size) as a function of time, as obtained via CBR sensor 102; and (2) the frequency of sounds as a function of time, as obtained from acoustic sensor 106. FIG. 4 depicts a threshold particle level, which is the normal background level of particles in the size range being monitored.

As shown from the plots, the particle size plot exceeds the threshold particle size at time $T_2$. A change in frequency distribution of the sounds obtained by acoustics sensor 106 occurs at time $T_1$. The time difference between times $T_1$ and $T_2$ is x, the time delay between release of a CBR agent and the appearance of elevated levels of the agent, as determined by CBR sensor 102. Times $T_1$ and $T_2$ are referred to herein as being "correlated," since there is a relationship between them that pertains to the release of CBR agent. The relationship, of course, is time delay, x.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
   receiving, at a processor, first time-varying data containing information related to a property of a chemical, biological or radiological agent;
   receiving, at the processor, second time-varying data containing acoustics-related information;
   determining, at the processor, if the following conditions are satisfied:
   (i) the property information in said first time-varying data indicates that, at a time $t_2$, said agent is likely to be present at a concentration that is higher than a normal background level of said agent;
   (ii) an acoustic signature that is indicative of release of said chemical, biological, or radiological agent is identified within said second timing-varying data at a time $t_1$;
   (iii) said times $t_1$ and $t_2$ are correlated; and
   generating an alert at an output device when conditions (i), (ii), and (iii) are satisfied.

2. The method of claim 1 wherein the operation of receiving the second time-varying data further comprises:
   obtaining said acoustics-related information, over time, in the form of sound waves using an acoustic detector; and
   generating a time-varying signal a(t) based on said sound waves.

3. The method of claim 2 wherein the operation of receiving the first time varying data further comprises:
   obtaining measurements of said property, over time, using a sensor; and
   generating a time-varying signal p(t) based on said measurements.

4. The method of claim 3 further comprising transmitting said time-varying signals a(t) and p(t) to a receiver.

5. The method of claim 3 wherein said acoustic detector is disposed in a first region and said sensor is disposed in said first region.

6. The method of claim 3 wherein the acoustic detector and the sensor are both located in a first location that is being monitored for the chemical, biological, or radiological agent.

7. The method of claim 2 further comprising transmitting said time-varying signal a(t) to a transceiver.

8. The method of claim 2 wherein the acoustic acoustic detector is a microphone.

9. An apparatus for autonomous detection of a chemical, biological, or radiological agent in a monitored environment, comprising:
   a CBR sensor for sensing information related to a property of said chemical, biological, or radiological agent;
   an acoustic sensor for sensing sound and generating a signal a(t) responsive thereto; and
   a processor for evaluating a confidence level that release of said agent has occurred, wherein said confidence level is based on:
   (i) a first indication of the presence of said agent in said monitored environment, wherein said first indication is based on said information acquired by said CBR sensor; and
   (ii) the presence or absence of a second indication that release of said agent has occurred in said monitored environment, wherein said second indication is based on acoustics-related information contained in said signal a(t); and
   (iii) a correspondence between a time $T_1$ when said first indication appears in said information from said CBR sensor and a time $T_2$ when said second indication appears in information that is obtained from said signal a(t).

10. The apparatus of claim 9 wherein said processor is further operable to analyze said signal a(t) within a window of time related to time $T_2$.

11. The apparatus of claim 10 further comprising a processor-accessible storage medium, wherein said storage medium contains a plurality of reference acoustic signatures, wherein said reference acoustic signatures define sounds that are indicative of a release of a chemical, biological, or radiological agent.

12. The apparatus of claim 11 wherein said processor is operable to obtain an acoustic signature from said signal a(t) within said window of time and to compare said acoustic signature with said reference acoustic signatures.

13. The apparatus of claim 12 wherein said confidence level is based, in part, on whether or not said acoustic signature matches said at least one reference acoustic signature.

14. The apparatus of claim 9 further comprising an output device for generating an alert when said processor determines that said confidence level indicates that release of said chemical, biological, or radiological agent has occurred.

15. A method comprising:
   identifying, in a first processor, from information related to a property of a chemical, biological or radiological agent, a change in said property beginning at time $t_2$, wherein said change is indicative of the presence or an increase in said chemical, biological or radiological agent; and
   corroborating, in a second processor, said change by identifying an acoustic signature, at a time $(t_2-x)$, in a time-varying signal a(t) that contains acoustics-related information, wherein:
      (i) said acoustic signature is indicative of a release of said chemical, biological, or radiological agent; and
      (ii) x relates to an expected time delay between the appearance of said acoustic signature in said time-varying signal a(t) and appearance of said change in said property at time $t_2$.

16. The method of claim 15 wherein the operation of identifying said acoustic signature comprises:
   comparing, in the second processor, said acoustic signature to a plurality of reference acoustic signatures that are known to be associated with the release of a chemical, biological, or radiological agent; and
   matching, in said the second processor, said acoustic signature to at least one of said reference acoustic signatures.

17. The method of claim 16 wherein the operation of matching comprises utilizing a processing technique that is selected from the group consisting of fuzzy-logic processing, wavelet processing, and neural-net processing to select said at least one reference acoustic signature that corresponds to said acoustic signature.

18. The method of claim 16 wherein the operation of identifying further comprises obtaining a fast Fourier transform of said time-varying signal a(t) beginning at time $(t_2-x)$.

19. The method of claim 15 and further wherein the first processor is disposed in a device that obtains the information related to a property of the chemical, biological or radiological agent.

20. A method comprising:
   obtaining, from a first environment, first time-varying data that is related to a property of a chemical, biological, or radiological agent;
   obtaining, from the first environment, second time-varying data that is not related to a property of the chemical, biological, or radiological agent but, when considered in conjunction with the first time-varying data, affects the confidence level of any determination that is reached with respect to the first time-varying data as to the presence of the chemical, biological, or radiological agent;
   determining, in a first processor, whether the first time-varying data indicates the presence of the chemical, biological, or radiological agent in the first environment;
   evaluating, in the first processor or in a second processor, the affect that the second-time-varying data has on a confidence level of the determination reached with respect to the first time-varying data;
   determining, in the first processor or in a second processor, whether the chemical, biological, or radiological agent is present in the first environment, based on the confidence level; and
   generating an alarm, in conjunction with an output device, when the chemical, biological, or radiological agent is determined to be present in the first environment.

* * * * *